(No Model.)
C. H. OSBORN.
STEAM PUMP.
No. 254,684. Patented Mar. 7, 1882.
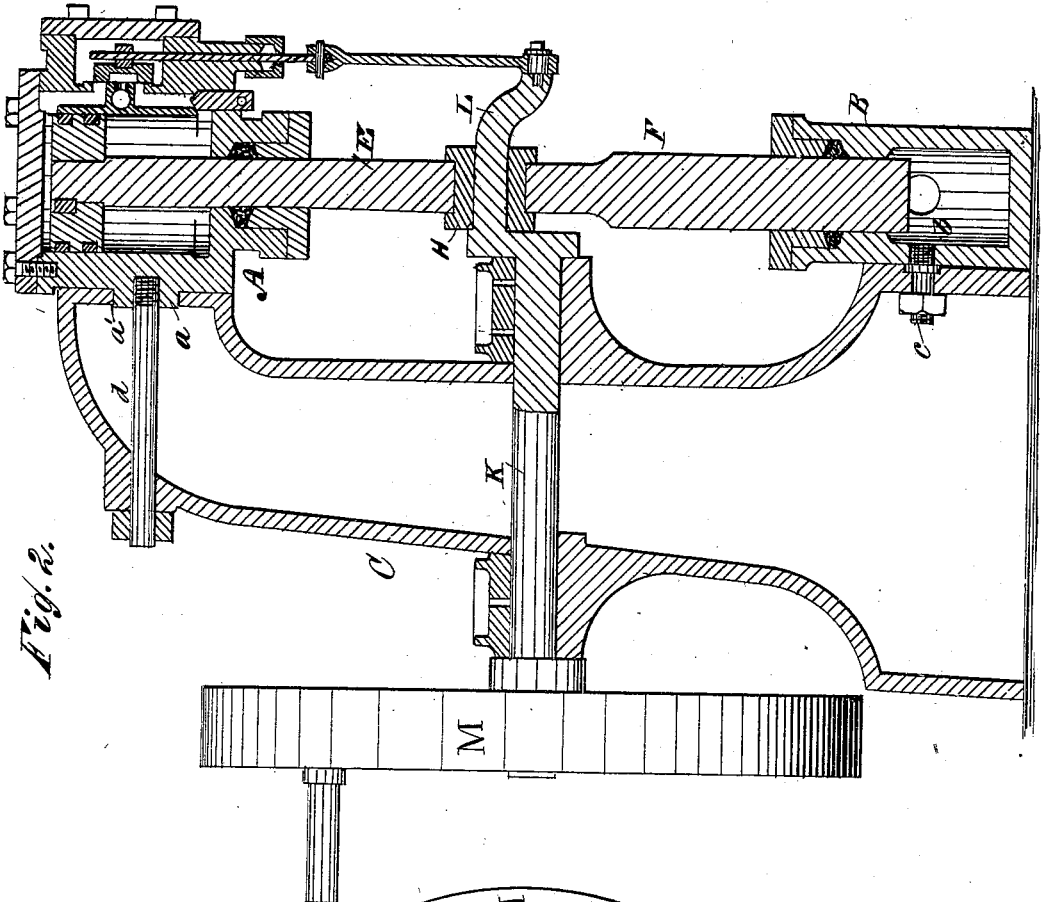
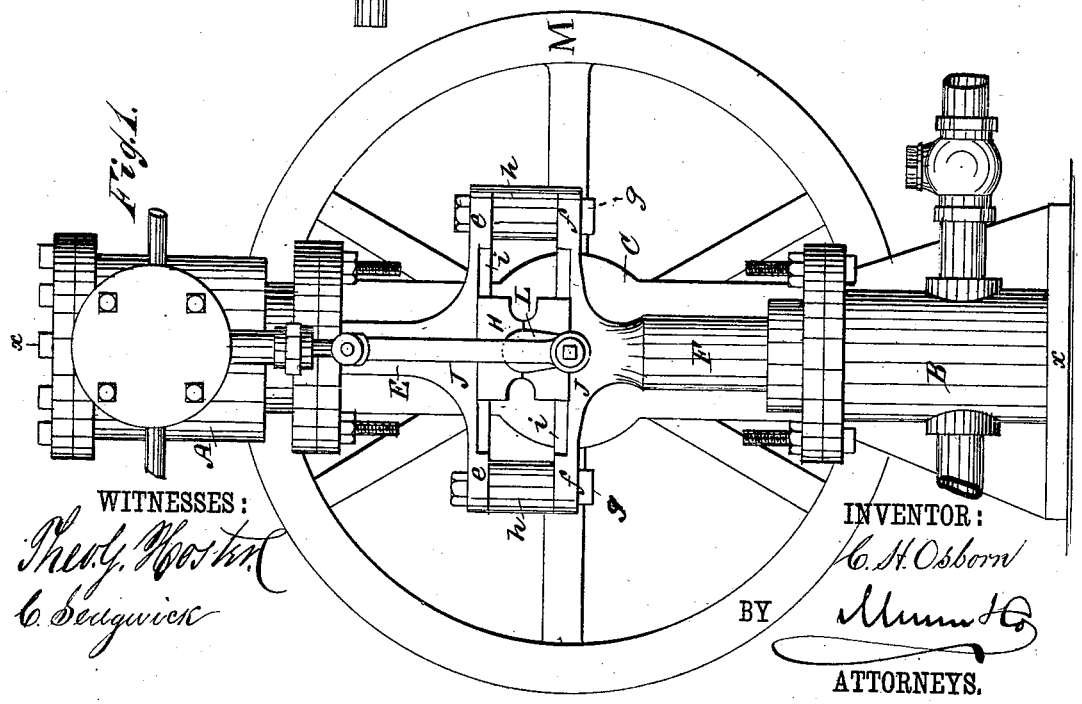
WITNESSES:
Theo. G. Hoster
C. Sedgwick
INVENTOR:
C. H. Osborn
BY Munn & Co
ATTORNEYS.

UNITED STATES PATENT OFFICE.

CAMPBELL H. OSBORN, OF CLARKSBURG, WEST VIRGINIA.

STEAM-PUMP.

SPECIFICATION forming part of Letters Patent No. 254,684, dated March 7, 1882.

Application filed September 15, 1881. (No model.)

*To all whom it may concern:*

Be it known that I, CAMPBELL H. OSBORN, of Clarksburg, in the county of Harrison and State of West Virginia, have invented a new and useful Improvement in Steam-Pumps, of which the following is a full, clear, and exact specification.

My invention has relation to that class of steam-pumps in which the piston-rod of the engine and the plunger-rod of the pump are rigidly connected together and act as a single rod, a way being formed between the joined ends of the rods to accommodate the movement of the cross-head through which the crank passes; and the object of my invention is to mount the cylinders of the pump and engine in such a manner upon the frame, standard, or support that they will automatically line themselves with each other.

My invention consists mainly in attaching the cylinders to the frame by means of swiveled or pivotal connections.

The invention further consists in the cylinders thus pivotally attached to the frame or support, in combination with the rigidly-joined piston and plunger rods and with the crank and sliding cross-head; and also of the construction and arrangement of the parts, as shown and hereinafter fully described.

Reference is to be had to the accompanying drawings, forming part of this specification, in which similar letters of reference indicate corresponding parts in all the figures.

Figure 1 is a front elevation of my invention; and Fig. 2 is a sectional elevation thereof, taken on the line $x\,x$ of Fig. 1.

In the drawings, C represents the frame or standard. A represents the steam-cylinder, the piston-head and valves of which are of ordinary construction; and B represents the pump-cylinder, which is of ordinary construction, except that it is provided with the screw-tap $b$ for receiving the screw-bolt $c$, by which the cylinder is pivotally secured to the lower face of the frame or standard.

The steam-cylinder A is preferably cast with the hub or boss $a$, which is screw-tapped in the center to receive the rod $d$, by which the steam-cylinder is likewise pivotally connected to the frame or standard, the hub or boss passing through the hole $a'$ in the upper face of the frame, as shown.

The piston-rod E of the engine and the plunger-rod F of the pump are formed with the corresponding extensions or heads, J J, the ends $e\,e$ and $f\,f$ of which are perforated for the passage of the bolts $g\,g$, which join the rods rigidly together, the collars $h\,h$ being placed upon the bolts between the extensions $e\,e$ and $f\,f$, so as to leave a suitable space between the heads J J to receive the cross-head H, through which the crank L of the shaft K passes. This cross-head is formed to fit upon the ways $i\,i$, which are made in the parallel faces of the heads of the rods, and moves back and forth thereon as the crank is caused to revolve by the reciprocation of the piston-rod of the steam-engine, or by hand or other power applied to the wheel M upon the shaft K. By this arrangement, the cylinders being swiveled or pivoted and the piston and plunger rods being rigidly joined together to act as one bar or rod, it will be understood that the whole are thus made universal in action, and that the cylinders will automatically accommodate themselves upon their pivots to the direction of reciprocation of the rods, and will always keep in exact line, thus not only dispensing with the labor of "lining" the cylinders, which is always considerable, but preventing all possible danger of the cylinders ever getting out of line.

Instead of using an upright frame or standard, as shown in the drawings, the cylinders may be supported horizontally upon any suitable support, or they may be supported at any inclination or angle, if desired, and not depart from the principle of my invention.

Having thus fully described my invention, I claim as new and desire to secure by Letters Patent—

1. The pivoted steam-cylinder A and the pivoted pump-cylinder B, in combination with the rigidly-joined piston-rod E and plunger-rod F, as and for the purposes set forth.

2. The rigidly-joined rods E and F, in combination with the cross-head H and the pivoted or swiveled cylinders A and B, substantially as and for the purposes set forth.

CAMPBELL H. OSBORN.

Witnesses:
C. C. ZINN,
W. B. OSBORN.